United States Patent [19]

Ray

[11] Patent Number: 4,623,135
[45] Date of Patent: Nov. 18, 1986

[54] VIBRATION DAMPING DEVICE

[75] Inventor: Jean Ray, Donnemain, France

[73] Assignee: Hutchinson, Paris, France

[21] Appl. No.: 632,842

[22] Filed: Jul. 20, 1984

[30] Foreign Application Priority Data

Jul. 21, 1983 [FR] France ................. 83 12046

[51] Int. Cl.$^4$ ................. F16M 1/00; F16F 9/04
[52] U.S. Cl. ................. 267/140.1; 188/298;
248/562; 267/8 R
[58] Field of Search ........... 267/8 R, 63 R, 113,
267/136, 140.1, 121, 141.2, 141.3, 153; 180/300;
248/559, 562, 636, 550; 188/379, 380, 298

[56] References Cited

U.S. PATENT DOCUMENTS

| | | | |
|---|---|---|---|
| 2,524,405 | 10/1950 | Storrs | 267/140.1 |
| 2,705,118 | 3/1955 | Beck | 267/121 X |
| 3,419,111 | 12/1968 | Jones et al. | 188/379 |
| 3,658,314 | 4/1972 | Luzsicza | 267/121 |
| 3,990,324 | 11/1976 | Fismbaugh et al. | 188/379 X |
| 4,383,679 | 5/1983 | Kakimoto | 267/140.1 |

FOREIGN PATENT DOCUMENTS 0652479 4/1951 United Kingdom ............ 267/141.2

Primary Examiner—Bruce H. Stoner, Jr.
Assistant Examiner—Robert J. Oberleitner
Attorney, Agent, or Firm—Larson and Taylor

[57] ABSTRACT

A vibration damping device is provided inserted between a fixed support (1) and a mobile member (2), comprising a main resilient element (4) inserted between the support and the member and a damping system mounted in parallel across the main resilient element and comprising a frame (8) connected to the mobile member and a piston (11) bathing in a damping medium contained in a bowl, (5) integral with the fixed support, the piston being mounted on the frame through a sleeve (9) made from a resilient material.

10 Claims, 1 Drawing Figure

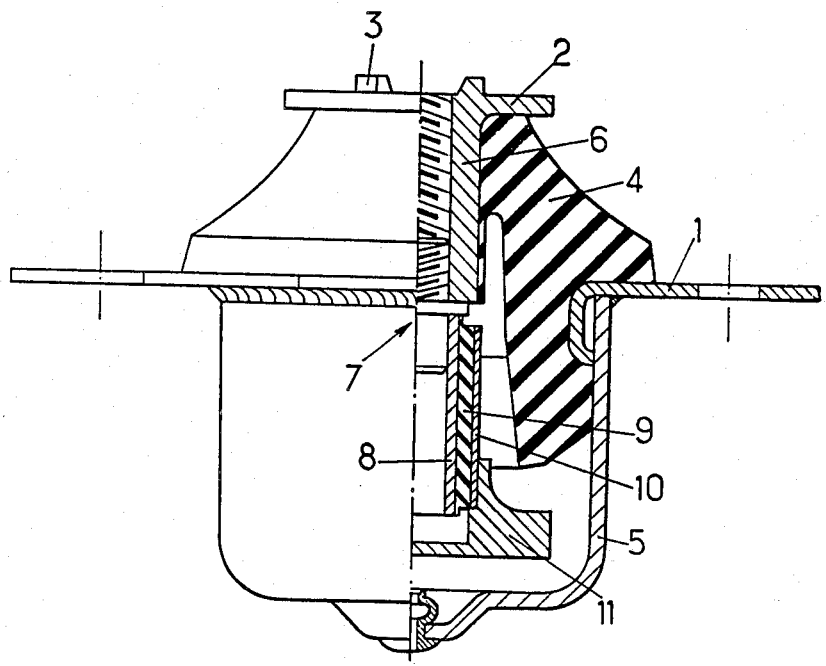

VIBRATION DAMPING DEVICE

The present invention relates to a device for damping the vibrations which may occur between a fixed support and a mobile member, of the type comprising a main resilient element inserted between said support and said member and a damping system mounted in parallel across the resilient element and comprising a frame or rod connected to the mobile member and a piston mounted on the frame and bathing in a damping medium contained in a bowl integral with the fixed support.

Such devices may be used for supporting motor car engines.

In a known device of the above mentioned type, the piston is mounted on a frame with a certain axial play, namely a play operative in the main direction of the vibrations.

This play is calculated depending on the amplitude of the vibrations at different frequencies, on the one hand so that the damping effect of the piston is only exerted for the low frequencies of the vibrations, from about 0 to 50 Hz, so as to avoid deflections of the engine which are too excessive, for example should a sudden change of level act on a wheel and, on the other hand, so that on the contrary this damping effect is not exerted for the highest frequencies, namely from about 50 to 200 Hz, so as to reduce the forces exerted on the device and so the noise at high speed operation.

Thus, considering that a current value for the deflection of the engine is approximately more or less 1 mm from 0 to 50 Hz and approximately more or less 0.1 mm from 50 to 200 Hz, it can be seen that an axial play of about 0.2 mm in the mounting of the piston on the frame will solve this problem.

However, the drawback of this type of device resides in the fact, that, because of the viscosity of the damping medium in which it bathes, the piston tends to adhere to the frame which it surrounds, which tends to restore to it its damping role for the high frequencies, which it is desirable to avoid.

In addition, when this adhesion does not occur, the piston is noisy because of its repeated beatings on the frame, within the low frequency range.

To avoid these drawbacks, it has already been proposed to insert resilient washers axially between the piston, mounted for axial sliding on the frame, and stops provided on the frame itself.

With this arrangement, as with the preceding devices, considerable damping may be obtained at low frequencies, while avoiding appreciable rigidification at high frequencies, and with a more gradual effect than before.

In fact, the elastic washers allow the low frequcy vibrations acting on the mobile member to be transmitted to the piston, the piston then playing its damping role, whereas at the high frequencies the smaller deflections of the mobile member are accomodated by the resilient washers and will only be transmitted to a very small extent to the piston.

The present invention proposes a simpler and more reliable construction for the damping devices of the kind in question.

To this end, the devices are essentially characterized in accordance with the invention in that the piston is mounted on the frame with radial interpositioning of a sleeve made from a resilient material.

The invention will now be described by way of example which is in no wise limitative, with reference to the single FIGURE of the accompanying drawings.

This single FIGURE shows in axial half section and in an external half view, a damping device constructed in accordance with the invention.

At 1 is shown the fixed support, firmly secured for example to the chassis of the vehicle and at 2 the mobile member with positioning studs 3, on which the engine will rest.

Between support 1 and member 2 is inserted a main resilient element 4 forcibly fitted, by resilient deformation, in a steel case 5 welded under support 1 and the bottom of which forms a bowl, which contains a damping medium (not shown) formed for example by high viscosity oil.

The main resilient element 4 is bonded to a central hollow core 6 of the mobile member 2, which core 6 is screwed on a stud 7 for centering and for connection to an axial tubular frame 8, the lower half of this stud 7 being fitted into the upper end of said frame.

On this frame 8 is bonded a sleeve 9 made from a resilient material itself surrounded by a rigid tube 10.

On the lower end of this tube is rigidly mounted a damping disk 11 forming piston which bathes in the damping medium occupying the bottom of bowl 5.

Thus a vibration damping device is obtained comprising, between the fixed support 1 and the mobile member 2, the two following systems mounted in parallel:
  the main resilient element 4,
  a damping system comprising in series the damping piston 11 and the resilient sleeve 9.

As explained above, the resilient sleeve 9 will act more especially at fairly high vibration frequencies so as to avoid excessive rigidification at these frequencies, the damping effect of piston 11 being essentially exerted at low frequencies, with a very gradual transition between the two frequency ranges and without appreciable creation of noise.

The resilient sleeve construction according to the invention presents numerous advantages over the previously known resilient washer construction, particularly the following:
  only a single sleeve is required,
  it only occupies a very small space in the radial direction,
  it ensures resilient mounting of the piston not only in the axial direction but also in all directions, which automatically removes the risk of seizure which might occur between the mutually sliding cylindrical faces of the piston and the frame,
  this construction further isolates the central frame from the viscous liquid,
  it also allows a solid disk not perforated at its center and terminating the central frame axially to be used for the piston.

As is evident and as it follows moreover already from what has gone before the invention is in no wise limited to those of its modes of application and embodiments which have been more especially considered; it embraces, on the contrary, all variants thereof.

I claim:

1. A device for damping the vibrations which may occur between a fixed support and a mobile member, comprising a main resilient element inserted between said support and said member and a damping system mounted in parallel across the main resilient element and comprising a tubular frame connected to the mobile member and a piston resiliently mounted on the frame and completely immersed in a damping medium contained in a bowl integral with the fixed support, wherein the piston is mounted on the tubular frame with interposition therebetween of a sleeve made from a resilient material said sleeve being concentrically fixedly mounted to said tubular frame and fixedly mounted to said piston such that said resilient sleeve and said piston and damping medium are serially connected between the fixed support and the mobile member, and so that said piston can move upwardly and downwardly from its rest position with respect to said tubular frame.

2. The device according to claim 1, characterized in that the sleeve is interposed jointingly between the frame and an outer tube integral with the piston.

3. The device according to claim 2, characterized in that the piston is a solid disk fixed to the end of the outer tube.

4. A device for damping the vibrations which may occur between a fixed support and a mobile member, of the type comprising a main resilient element inserted between said support and said member; and a damping system mounted in parallel across the main resilient element and comprising a tubular frame connected to the mobile member and a piston resiliently mounted on the frame and completely immersed in a damping medium contained in a bowl integral with the fixed support, characterized in that a sleeve of resilient material is mounted concentrically, fixedly between said tubular frame and an outer tube integral with the piston, such that said resilient sleeve and said piston and damping medium are serially connected between the fixed support and the mobile member, so that said piston can move, apart from its rest position, upwards and downwards with respect to said tubular frame.

5. The device according to claim 4, characterized in that the piston is a solid disk fixed to the end of the outer tube.

6. The device according to claim 5 characterized in that said piston is symmetrically mounted about the longitudinal axis of said device.

7. The device according to claim 6 and further comprising a mounting plate oriented, when the device is installed, on the vertical upper end of the device, said plate for supporting a moving part to be dampened; and depending connecting means mounted at the upper end thereof to said mounting plate; and wherein said tubular frame is mounted on said connecting means; wherein said main resilient element is coaxially located about said longitudinal axis between said mounting plate and the fixed support; and wherein said damping system is concentrically symmetrically mounted inside said main resilient element and is symmetrical about said vertical axis.

8. The device according to claim 4 characterized in that said piston is symmetrically mounted about the longitudinal axis of said device.

9. The device according to claim 8 and further comprising a mounting plate oriented, when the device is installed, on the vertical upper end of the device, said plate for supporting a moving part to be dampened; and depending connecting means mounted at the upper end thereof to said mounting plate; and wherein said tubular frame is mounted on said connecting means; wherein said main resilient element is coaxially located about said longitudinal axis between said mounting plate and the fixed support; and wherein said damping system is concentrically symmetrically mounted inside said main resilient element and is symmetrical about said vertical axis.

10. The device according to claim 4 and further comprising a mounting plate oriented, when the device is installed, on the vertical upper end of the device, said plate for supporting a moving part to be dampened; and depending connecting means mounted at the upper end thereof to said mounting plate; and wherein said tubular frame is mounted on said connecting means; wherein said main resilient element is coaxially located about said longitudinal axis between said mounting plate and the fixed support; and wherein said damping system is concentrically symmetrically mounted inside said main resilient element and is symmetrical about said vertical axis.

* * * * *